(12) United States Patent
Ogawa

(10) Patent No.: US 6,910,380 B2
(45) Date of Patent: Jun. 28, 2005

(54) ULTRASONIC TRANSMITTING AND RECEIVING APPARATUS

(75) Inventor: Eiji Ogawa, Kaisei-machi (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/804,064

(22) Filed: Mar. 19, 2004

(65) Prior Publication Data

US 2004/0187583 A1 Sep. 30, 2004

(30) Foreign Application Priority Data

Mar. 25, 2003 (JP) ...................................... 2003-081985

(51) Int. Cl.⁷ ................................................ A61B 8/00
(52) U.S. Cl. .............................. 73/628; 73/633; 73/641; 600/447
(58) Field of Search .......................... 73/628, 632, 633, 73/640, 641; 600/443, 447, 444

(56) References Cited

U.S. PATENT DOCUMENTS

| | | | | |
|---|---|---|---|---|
| 5,072,734 A | * | 12/1991 | Takeuchi | 600/441 |
| 5,309,914 A | * | 5/1994 | Iinuma | 600/443 |
| 6,126,598 A | * | 10/2000 | Entrekin et al. | 600/437 |
| 6,461,298 B1 | * | 10/2002 | Fenster et al. | 600/437 |
| 6,688,177 B2 | * | 2/2004 | Wiesauer | 73/618 |
| 6,783,495 B2 | * | 8/2004 | Ogawa | 600/437 |
| 6,789,427 B2 | * | 9/2004 | Batzinger et al. | 73/614 |
| 6,792,808 B1 | * | 9/2004 | Batzinger et al. | 73/602 |

FOREIGN PATENT DOCUMENTS

JP 2001-340338 A 12/2001

* cited by examiner

Primary Examiner—Hezron Williams
Assistant Examiner—Jacques M. Saint-Surin
(74) Attorney, Agent, or Firm—Sughrue Mion, PLLC

(57) ABSTRACT

An ultrasonic transmitting and receiving apparatus capable of obtaining ultrasonic images with uniform image quality independently of sound ray directions. The apparatus includes: an ultrasonic transducer array including plural ultrasonic transducers; a drive signal generating unit for generating drive signals for the plural ultrasonic transducers; a transmission control unit for controlling the drive signal generating unit such that transmitted ultrasonic waves form a transmission beam in a sound ray direction; a reception control unit for performing reception focusing processing on plural detection signals obtained based on received ultrasonic waves to generate sound ray data representing ultrasonic information relating to the sound ray direction; a storage unit for storing plural kinds of filter coefficients related to plural sound ray directions, respectively; and a filter processing unit for performing filter processing on the sound ray data by using filter coefficients related to the sound ray direction.

16 Claims, 16 Drawing Sheets

| 0 | $-\frac{1}{4}$ | 0 |
|---|---|---|
| $-\frac{1}{4}$ | $\frac{2}{4}$ | $-\frac{1}{4}$ |
| 0 | $-\frac{1}{4}$ | 0 |

FIG.12
| 0.05 | 0.25 | 0.4 | 0.25 | 0.05 |
|------|------|-----|------|------|
FIG.13
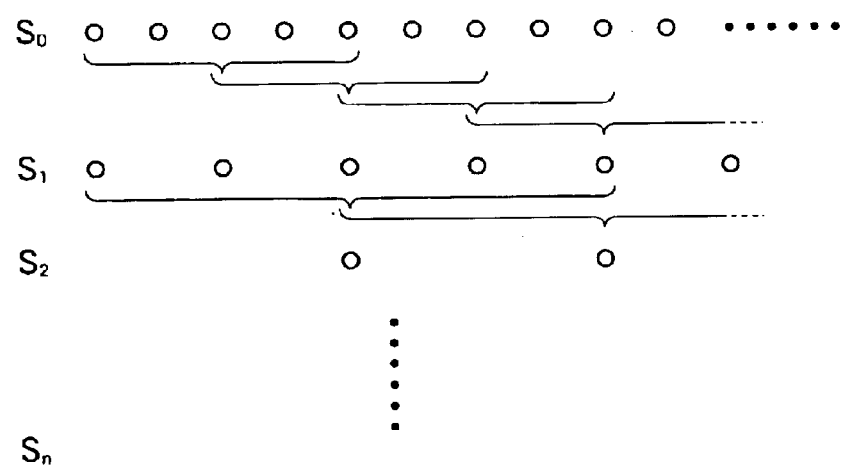
FIG.14
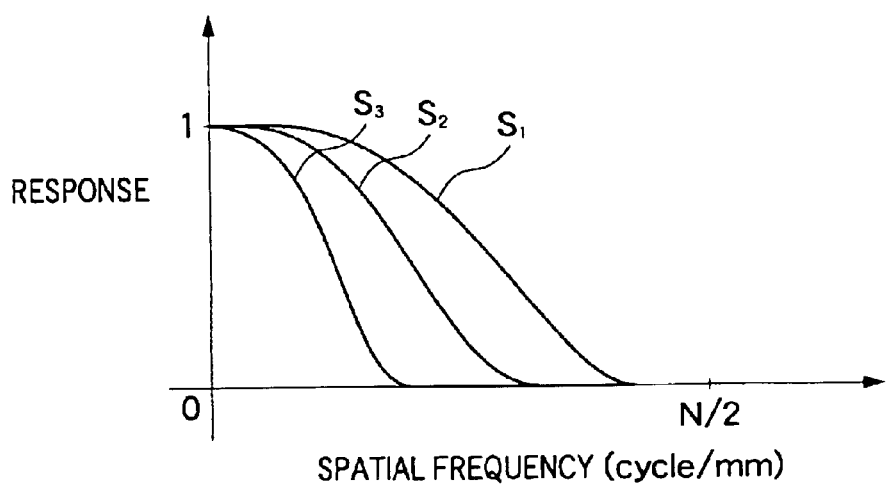

FIG.15
| 0.1 | 0.5 | 0.8 | 0.5 | 0.1 |
FIG.16
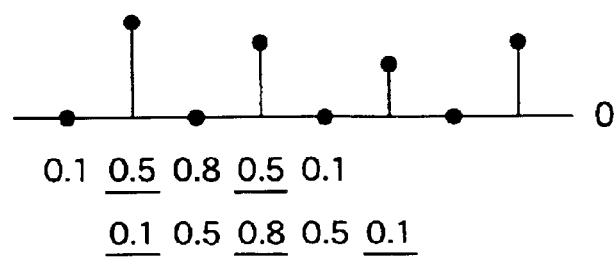
0.1  0.5  0.8  0.5  0.1
0.1  0.5  0.8  0.5  0.1
FIG.17
| 0.05 | 0.13 | 0.3 | 0.5 | 0.65 | 0.74 | 0.65 | 0.5 | 0.3 | 0.13 | 0.05 |
FIG.18
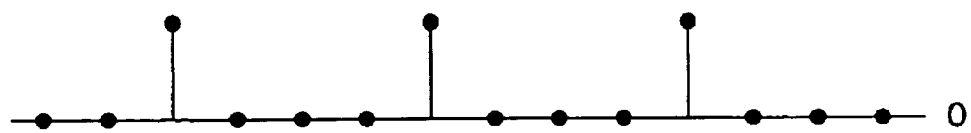

ULTRASONIC TRANSMITTING AND RECEIVING APPARATUS

BACKGROUND OF THE INVENTION

1. Field of the invention

The present invention relates to an ultrasonic transmitting and receiving apparatus to be used for obtaining ultrasonic images by transmitting ultrasonic waves and receiving ultrasonic echoes.

2. Description of a Related Art

FIG. 21 shows the structure of ultrasonic transducers included in an ultrasonic probe that is generally used in a conventional ultrasonic transmitting and receiving apparatus, and acoustic field distribution of an ultrasonic beam transmitted from the transducers. As shown in FIG. 21, the ultrasonic transducer array 100 is fabricated, for example, by linearly arranging a large number of piezoelectric elements 101 having electrodes 102 and 103 formed on both ends thereof. Drive signal generating circuits including pulsers etc. are connected to the electrodes 102 and 103. Applying a voltage to the electrodes provided on the piezoelectric element, the piezoelectric element expands and contracts by piezoelectric effect to generate ultrasonic waves. By driving plural piezoelectric elements at predetermined time intervals, spherical waves transmitted from the respective piezoelectric elements are synthesized and a focal point F of an ultrasonic beam can be formed in a desired direction and a desired depth.

Thus formed acoustic field of the ultrasonic beam is defined by an angle 106 when seeing the position of the focal point from the aperture of the ultrasonic transducer array 100 and a directivity angle Θ determined by the aperture of the transducer. In an ultrasonic beam formed by the phase delay method, the directivity angle Θ is an angle formed by a region, where beam intensity becomes zero by the synthesis of plural ultrasonic waves, and the X axis, and it represents the spread of the ultrasonic beam.

As shown in FIG. 21, the ultrasonic waves transmitted from the ultrasonic transducer array 100 are converged in the vicinity of the focal point F and diffused again. That is, the beam diameter of the ultrasonic beam differs according to the distance (depth) from the ultrasonic transducer array 100.

By the way, image quality of an ultrasonic image largely depends on the acoustic pressure intensity and beam diameter of transmitted and received ultrasonic beams. Since strong signal intensity is obtained by using an ultrasonic beam having high acoustic pressure intensity, slight change of the medium within an object to be inspected can be detected. Further, by using an ultrasonic beam having a narrow beam diameter, spatially detailed ultrasonic image information can be obtained. It is desired that the acoustic pressure intensity and the beam diameter are not only satisfactory values naturally, but also uniform over the imaging region. Because, if these values vary, the image quality of the ultrasonic image becomes nonuniform within the image to interfere with satisfactory ultrasonic diagnosis.

The longer the propagation distance, the more the ultrasonic wave is attenuated. Accordingly, the deeper the region of the object where an ultrasonic wave is reflected and an ultrasonic echo is generated, the weaker the detection signal of the ultrasonic echo. Therefore, in order to correct such attenuation of the ultrasonic wave, STC (sensitivity time control) has been conventionally used. The STC refers to signal processing of amplifying the detection signal of the ultrasonic echo while varying the amplification factor in accordance with the acquisition period. Here, the acquisition period refers to a period from a transmission time of the ultrasonic wave to a time point when the detection signal is acquired. That is, the deeper the region of the object where an ultrasonic wave is reflected and an ultrasonic echo is generated, the more largely the ultrasonic echo signal is amplified, and thereby, the detection signal having uniform intensity with respect to the depth direction of the object can be obtained.

Further, resolving power means discrimination capability of the object of imaging, and is represented by the minimum distance between two points as far as the two points can be discriminated. The resolving power includes axial resolving power with respect to the traveling direction (depth direction) of the ultrasonic beam and lateral resolving power with respect to the scanning direction of the ultrasonic beam. The axial resolving power included in the resolving power depends on the ultrasonic frequency and the sound speed.

On the other hand, the lateral resolving power is controlled generally in the following manner. As shown in FIG. 21, in the normal beam focus method, the region where the beam diameter is so small to have a focal depth "h", i.e., the region where the lateral resolving power is good, is short. Therefore, the multi-stage focus method in which ultrasonic beams are synthesized while shifting the focal depth "h" by transmitting the ultrasonic beams in plural times while varying the focal position in the depth direction is performed. The multi-stage focus is described in detail in "Ultrasonic Wave Manual" (Ultrasonic Wave Manual Editorial Board, p. 440).

Furthermore, Japanese Patent Application Publication JP-2001-340338A discloses that filter processing is performed with respect to the acquired image signals by using different frequency filters in accordance with the distance from the ultrasonic transducer. For example, when the detection signal relating to the depth is amplified by STC, noise is also amplified together. If spatial filter processing is uniformly performed with respect to the obtained sound ray data in order to reduce such noise, the sound ray data in the high resolving power region becomes also blurred. In addition, as described above, since the beam diameter of the ultrasonic beam differs according to the depth, the lateral resolving power and the acoustic pressure intensity also differ according to the depth. In such case, by performing different filter processing on the sound ray data in accordance with the depth, variations in the response characteristics relating to the depth direction can be corrected.

FIGS. 22A and 22B show acoustic pressure intensity distributions (hereinafter, also referred to as "acoustic pressure intensity profiles") formed on arbitrary focal planes within space by transmitting and receiving ultrasonic waves. These acoustic pressure intensity distributions are obtained by setting the following conditions in simulations. Here, the sound ray direction of the transmitted and received ultrasonic beam is represented by an angle θ and an angle φ. The angle θ is an angle relative to the first surface orthogonal to the transmission and reception surface of the ultrasonic transducer array, and the angle φ is an angle relative to the second surface orthogonal to the transmission and reception surface and the first surface.

FIG. 22A: sound ray direction θ=0°, φ=0°
focal length 70 mm
FIG. 22B: sound ray direction θ=32.5°, φ=32.5°
focal length 70 mm Further, constituent factors etc. of the ultrasonic transducer array are as follows, which are common in FIGS. 22A and 22B.

Array constituent factors:
circular aperture two-dimensional array
0.35 mm×0.35 mm in element size
18.9 mm diameter in array size
(number of elements: 42)
Transmission conditions:
number of used elements: 192
weighting with Gaussian distribution
Gaussian pulse 2.5 Hz, band 40%
Transmission conditions:
number of used elements: 64
no weighting From the result of the simulations, the beam diameter of 2.6 mm in the case of FIG. 22A and the beam diameter of 3.2 mm in the case of FIG. 22B are obtained. In FIGS. 22A and 22B, the beam diameter represents the diameter of the acoustic pressure distribution on the surface where the acoustic pressure is under the peak by −6 dB.

As described above, it is seen that the beam diameter of the ultrasonic beam changes depending not only on the depth, but also on the sound ray direction of the ultrasonic beam. Accordingly, the acoustic pressure intensity and the lateral resolving power also differ depending on the sound ray direction. However, in the conventional signal processing course of the ultrasonic image, the adjustment of the response in accordance with the sound ray direction has not been performed.

SUMMARY OF THE INVENTION

The present invention has been achieved in view of the above-described problems. An object of the present invention is to obtain ultrasonic images with uniform image quality independently of sound ray directions in an ultrasonic transmitting and receiving apparatus for acquiring ultrasonic images by transmitting and receiving ultrasonic waves.

In order to solve the above-described problems, an ultrasonic transmitting and receiving apparatus according to the present invention comprises: an ultrasonic transducer array including plural ultrasonic transducers for transmitting ultrasonic waves and receiving ultrasonic waves reflected from an object to be inspected; drive signal generating means for generating drive signals for respectively driving the plural ultrasonic transducers; transmission control means for controlling the drive signal generating means such that ultrasonic waves to be transmitted from the plural ultrasonic transducers form a transmission beam to be transmitted in at least one sound ray direction; reception control means for performing reception focusing processing on plural detection signals obtained based on ultrasonic waves received by the plural ultrasonic transducers so as to generate sound ray data representing ultrasonic information relating to the at least one sound ray direction; storage means for storing plural kinds of filter coefficients related to plural sound ray directions, respectively; and filter processing means for performing filter processing on the sound ray data generated by the reception control means by using filter coefficients related to the at least one sound ray direction in which transmission and reception have been performed from among the plural kinds of filter coefficients.

According to the present invention, since filter processing is performed on the sound ray data by using different filter coefficients in accordance with sound ray directions, ultrasonic images with uniform image quality can be obtained independently of sound ray directions.

BRIEF DESCRIPTION OF THE DRAWINGS

FIG. 12 is a diagram for explanation of multiple resolving power decomposition;

FIG. 13 is a diagram for explanation of multiple resolving power decomposition;

FIG. 14 is a diagram for explanation of multiple resolving power decomposition;

FIG. 15 is a diagram for explanation of multiple resolving power decomposition;

FIG. 16 is a diagram for explanation of multiple resolving power decomposition;

FIG. 17 is a diagram for explanation of multiple resolving power decomposition;

FIG. 18 is a diagram for explanation of multiple resolving power decomposition;

DESCRIPTION OF THE PREFERRED EMBODIMENTS

Figure 1:
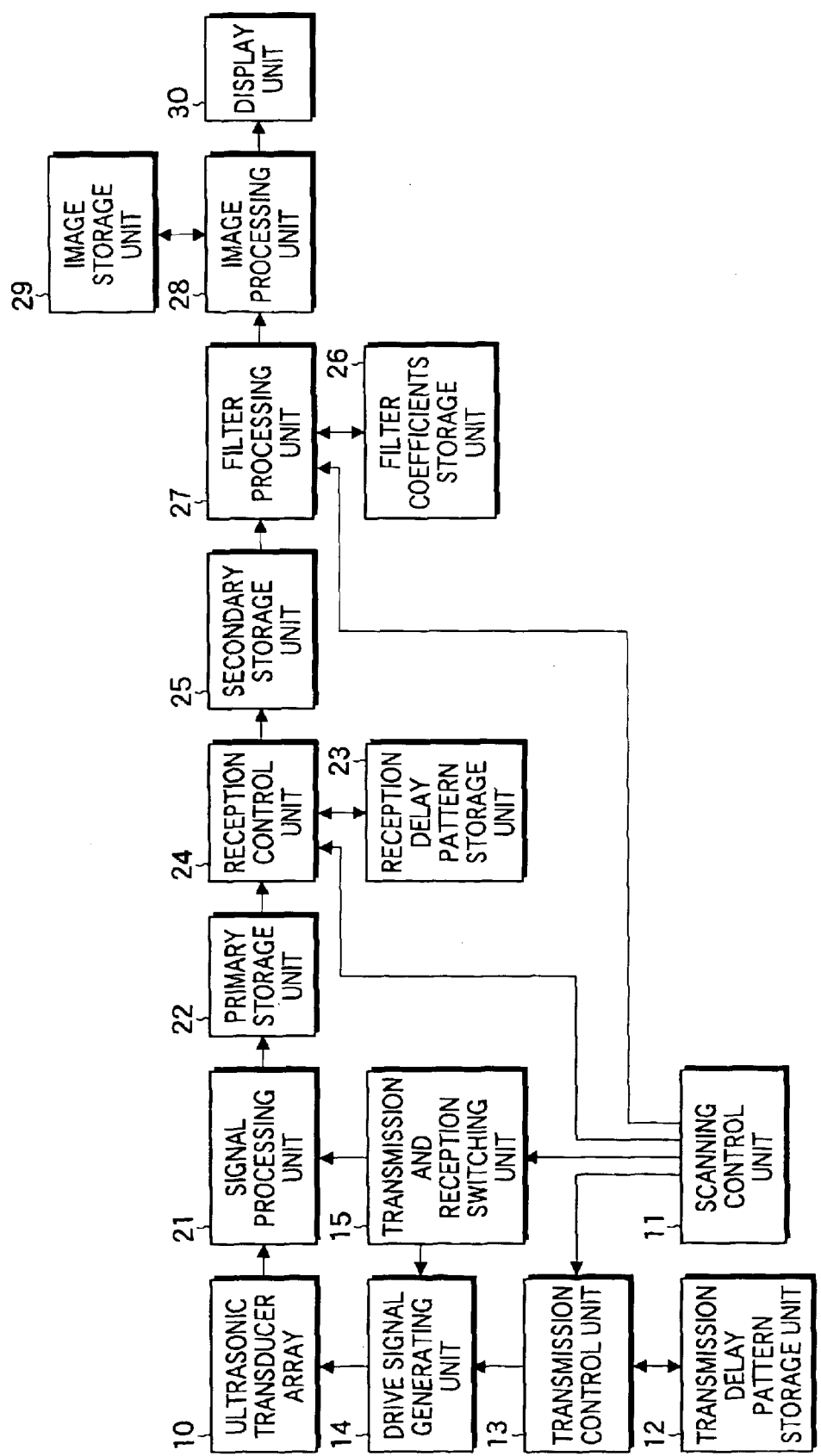
FIG. 1 is a block diagram showing the constitution of an ultrasonic transmitting and receiving apparatus according to the first embodiment of the present invention.

Hereinafter, embodiments of the present invention will be described in detail by referring to the drawings. The same component elements are assigned with the same reference numerals and the descriptions thereof will be omitted. In the present application, the propagation direction of a transmission beam, which is formed by ultrasonic waves transmitted in adjusted phases from plural ultrasonic transducers and propagates in a desired direction, is referred to as a "sound ray direction". Also, the propagation direction of a reception beam, which is obtained by synthesizing the phase matched detection signal of ultrasonic echoes received in plural ultrasonic transducers and propagates from a desired direction, is referred to as a "sound ray direction".

FIG. 1 is a block diagram showing the constitution of an ultrasonic transmitting and receiving apparatus according to the first embodiment of the present invention. The ultrasonic transmitting and receiving apparatus according to this embodiment is for displaying moving images nearly in real time by processing detection signals while performing transmission and reception of ultrasonic waves.

An ultrasonic transducer array 10 includes plural ultrasonic transducers (also referred to "elements") arranged in a two-dimensional matrix form, for example, and, by controlling these ultrasonic transducers electronically, an object to be inspected is scanned electronically. The plural ultrasonic transducers transmit ultrasonic beams based on drive signals applied thereto, and receive ultrasonic waves reflected from the object to output detection signals. These ultrasonic transducers are constituted by a vibrator in which electrodes are formed on both ends of a material having a piezoelectric property (piezoelectric element) such as piezoelectric ceramic represented by PZT (Pb (lead) zirconate titanate) or a macromolecule piezoelectric element represented by PVDF (polyvinylidene difluoride), for example. Applying a voltage to the electrodes of such vibrator by transmitting a pulsed electrical signal or continuous wave electrical signal, the piezoelectric element expands and contracts. By the expansion and contraction, pulsed or continuous ultrasonic waves are generated from the respective vibrators, and these ultrasonic waves are synthesized to form ultrasonic beams. Further, the respective vibrators expand and contract by receiving propagating ultrasonic waves and generate electrical signals. These electrical signals are outputted as detection signals of ultrasonic waves.

Alternatively, as the ultrasonic transducers, plural kinds of elements of different ultrasonic conversion methods may be used. For example, the above described vibrator is used as an element for transmitting ultrasonic waves, and a photodetection type ultrasonic transducer is used as an element for receiving ultrasonic waves. The photo-detection type ultrasonic transducer is for detecting an ultrasonic signal by converting it into an optical signal, and, for example, constituted by a Fabry-Perot resonator or fiber Bragg grating.

The ultrasonic transmitting and receiving apparatus according to this embodiment includes a scanning control unit 11, a transmission delay pattern storage unit 12, a transmission control unit 13, a drive signal generating unit 14, and a transmission and reception switching unit 15.

The scanning control unit 11 sets scanning directions of ultrasonic beams so that the object may be scanned in predetermined directions, and sets sound ray directions of transmitted and received ultrasonic beams in accordance with the scanning directions. Further, the scanning control unit 11 controls respective units of the ultrasonic transmitting and receiving apparatus so that an ultrasonic beam constituted of ultrasonic components having predetermined directivity may be transmitted and received in a preset direction.

The transmission delay pattern storage unit 12 has stored plural transmission delay patterns in which delay times to be provided to the plural elements are set. The transmission delay patterns are used when an ultrasonic beam is transmitted in the sound ray direction set by the scanning control unit 11.

The transmission control unit 13 selects a particular transmission delay pattern from among plural transmission delay patterns stored in the transmission delay pattern storage unit 12, based on the sound ray direction set by the scanning control unit 11. Further, the transmission control unit 13 sets the delay times to be respectively provided to the plural elements included in the ultrasonic transducer array 10 based on the selected transmission delay pattern.

The drive signal generating unit 14 is constituted by, for example, plural pulsers corresponding to the plural elements, respectively. Each of the plural pulsers generates a drive signal based on the delay time set by the transmission control unit 13. Thereby, the transmission beam propagating toward the set direction is formed.

The transmission and reception switching unit 15 switches the generation of drive signals in the drive signal generating unit 14 and capture of the detection signals in a signal processing unit 21 with predetermined timing according to the control of the scanning control unit 11. By restricting the time periods for reading detection signals as described above, ultrasonic echo signals reflected from a particular depth of the object can be detected.

Further, the ultrasonic transmitting and receiving apparatus according to this embodiment includes the signal processing unit 21, a primary storage unit 22, a reception delay pattern storage unit 23, a reception control unit 24, a secondary storage unit 25, a filter coefficient storage unit 26, a filter processing unit 27, an image processing unit 28, an image storage unit 29, a display unit 30, and an input unit 31.

The signal processing unit 21 includes plural channels respectively corresponding to the plural elements. Each of the plural channels of the signal processing unit 21 captures the detection signal outputted from the corresponding element with predetermined timing, and performs signal processing such as logarithmic amplification, demodulation, STC (sensitivity time control), filter processing for eliminating unwanted bands, A/D conversion. The primary storage unit 22 includes plural lines respectively corresponding to the plural channels of the signal processing unit 21 and stores detection signals subjected to signal processing in the signal processing unit 21 with respect to each line in chronological order.

The reception delay pattern storage unit 23 has stored plural reception delay patterns in which delay times to be provided to the detection signals outputted from the plural elements are set. The reception delay pattern is used when reception focusing processing is performed so that the received ultrasonic waves (ultrasonic echoes) may form a reception focal point in the predetermined sound ray direction and depth.

The reception control unit 24 selects a predetermined reception delay pattern from the reception delay patterns stored in the reception delay pattern storage unit 23 based on the sound ray direction set in the scanning control unit 11. Further, the reception control unit 24 performs reception focusing processing by providing delays to the plural detection signals respectively outputted from the plural elements based on the selected reception delay pattern and adding them. Thereby, sound ray data representing the reception beam with the focal point narrowed down in the set sound ray direction is formed. The secondary storage unit 25 stores the sound ray data formed in the reception control unit 24.

The filter coefficient storage unit 26 has stored plural kinds of filter coefficients to be used when performing filter processing on sound ray data. These filter coefficients are related to the plural sound ray directions, respectively. When performing filter processing, particular filter coefficients are selected in accordance with the scanning direction set by the scanning control unit 11. These filter coefficients will be described later in detail.

The filter processing unit 27 performs filter processing such as response enhancement, interpolation processing, scale-up, scale-down, etc. and coordinate transformation.

The image processing unit 28 converts the sound ray data in the scanning space of the ultrasonic beam into image data in the physical space by performing conversion of the scanning format with respect to filter processed sound ray data. Further, the image processing unit 28 constructs two-dimensional or three-dimensional image data based on thus generated sound ray data, and further performs image processing such as gain adjustment, contrast adjustment, gradation processing on the image data.

The image storage unit 29 stores image data generated in the image processing unit 28.

The display unit 30 includes a display device such as a CRT or an LCD, for example, and displays ultrasonic images based on the image data image processed in the filter processing unit 27.

Figure 2:
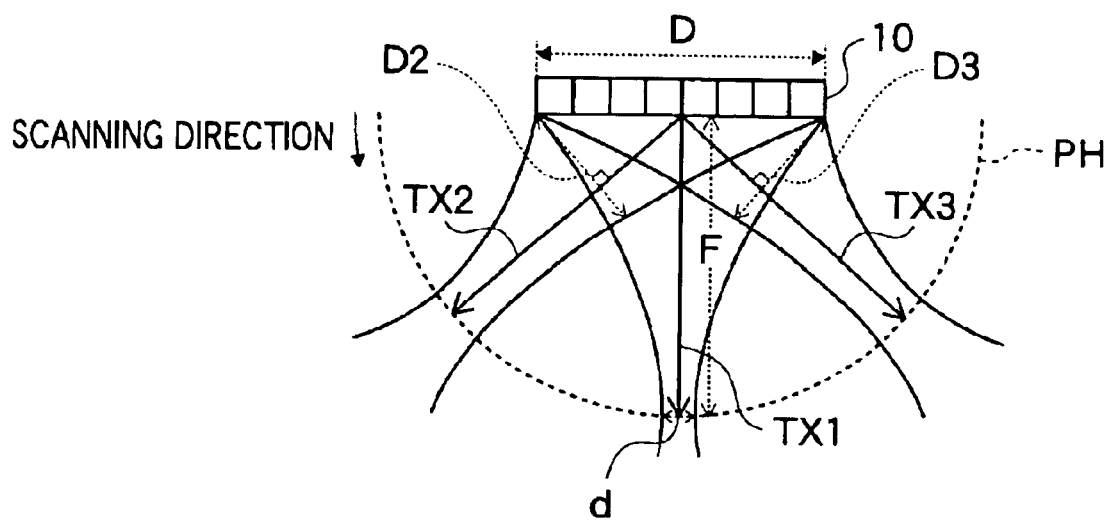
FIG. 2 is a diagram for explanation of the relationship between the sound ray direction and the lateral resolving power of an ultrasonic beam.

Next, the filter processing performed in the filter processing unit 27 will be described in detail by referring to FIG. 2. The ultrasonic transmitting and receiving apparatus according to this embodiment is characterized in that the filter processing different in accordance with the sound ray directions is performed on the detection signals of the ultrasonic echoes. FIG. 2 is a diagram for explanation of the relationship between the sound ray direction and the lateral resolving power of the ultrasonic beam. In the below, the sound ray angle means an angle formed by the front direction of the ultrasonic transducer array 10 and the sound ray direction.

The lateral resolving power $\Delta Y$ of the ultrasonic beam is represented as $d/2$ by using beam diameter "d". Here, the beam diameter "d" is a diameter at the zero cross point of the directivity function representing the ultrasonic beam. Accordingly, in the case of the circular aperture two-dimensional array, the lateral resolving power $\Delta Y$ is expressed as follows by using the focal length "F", wavelength $\lambda$ of the ultrasonic wave, diameter "D" of the aperture.

$$\Delta Y = d/2 = 1.22 \times F \times \lambda / D \quad (1)$$

From the equation (1), it is seen that the larger the aperture diameter "D", the more the lateral resolving power $\Delta Y$ is improved (the value becomes smaller), and, contrary, the smaller the aperture diameter "D", the more the lateral resolving power $\Delta Y$ is reduced (the value becomes larger).

The isochronal surface PH shown in FIG. 2 is a surface where the ultrasonic beams reach in predetermined time elapsed from being transmitted, and includes plural regions at nearly equal distances from the ultrasonic transducer.

In the case where an ultrasonic beam is transmitted in the front direction of the ultrasonic transducer array 10, i.e., in the direction TX1 at the small sound ray angle, the aperture diameter that contributes to the formation of the ultrasonic beam is "D". However, even on the regions on the same equidistant surface, in the case where the ultrasonic beam is transmitted in the TX2 direction or the TX3 direction, the aperture diameter when seeing the aperture from the sound ray direction becomes D2 (D2<D) or D3 (D3<D). That is, as the sound ray angle is made larger, the aperture diameter that substantially contributes to the formation of the ultrasonic beam becomes smaller. Accordingly, from the equation (1), since the beam diameter d becomes larger, the lateral resolving power $\Delta Y$ is reduced. Further, when the beam diameter d becomes larger, the acoustic pressure energy is diffused, and thereby, the acoustic pressure intensity is also reduced.

As described above, even during scanning one equidistant surface, the lateral resolving power and the acoustic pressure intensity change by changing the sound ray direction. On this account, response characteristics change according to the positions within the screen, and thereby, ultrasonic images having uniform image quality can not be generated.

Therefore, in this embodiment, in order to correct variations in image quality due to change in the lateral resolving power and the acoustic pressure intensity, filter processing different in accordance with the sound ray direction of the ultrasonic beam is performed on the acquired sound ray data.

Figure 3A:
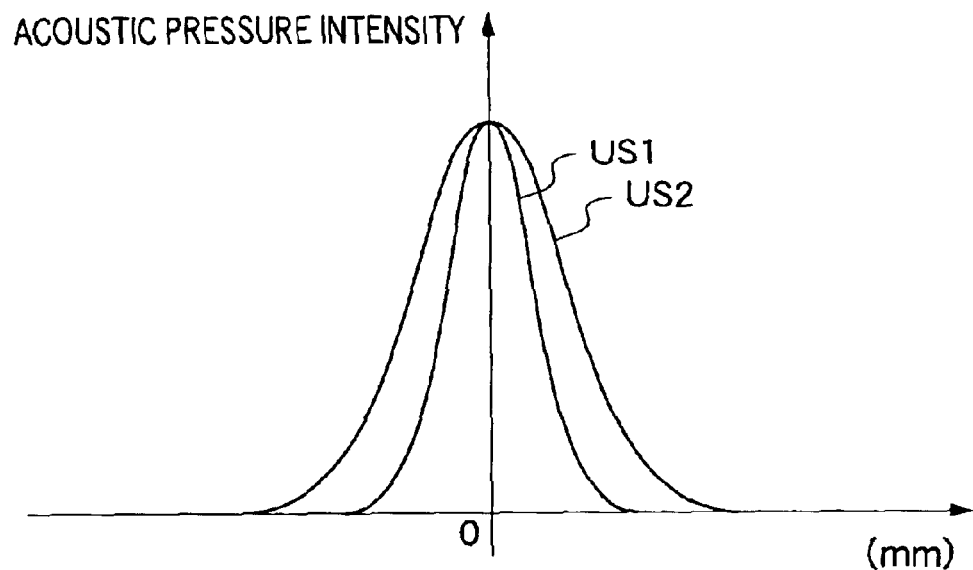
FIG. 3A shows acoustic pressure intensity distributions of two ultrasonic beams having different beam diameters.

As the filter processing, for example, generally used spatial filter processing is used. Here, FIG. 3A shows the acoustic pressure intensity distributions of two ultrasonic beams US1 and US2 having different beam diameters. As shown in FIG. 3A, both of the ultrasonic beams US1 and US2 are Gaussian beams having acoustic pressure intensity distributions represented by Gaussian distribution. The half width of the acoustic pressure intensity distribution in the ultrasonic beam US1 is 4.28 mm, and the half width of the acoustic pressure intensity distribution in the ultrasonic beam US2 is 7.34 mm.

Figure 3B:
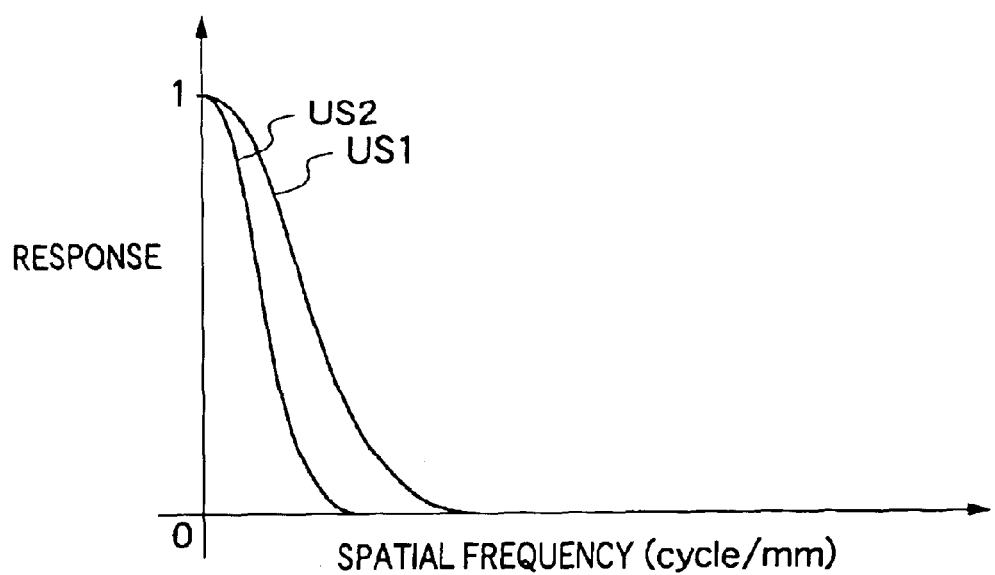
FIG. 3B shows response functions of the ultrasonic beams shown in FIG. 3A.

FIG. 3B shows response functions obtained by performing Fast Fourier Transformation (FFT) on the acoustic pressure intensity distributions representing the ultrasonic beams US1 and US2. Here, the response function refers to a transfer function between input signals and output signals to spatial frequencies.

As shown in FIG. 3B, compared to the ultrasonic beam US2 having a larger beam diameter, the ultrasonic beam US1 having a smaller beam diameter provides the response extending to higher frequency regions. That is, the ultrasonic beam having better lateral resolving power (US1) provides the better response in the high frequency bands. In other words, the smaller the sound ray angle, the better the response characteristics, and the larger the sound ray angle is made, the worse the response characteristics become. Therefore, in order to reduce variations in the lateral resolving power due to the sound ray direction, the filter processing for substantially matching the response characteristics in the larger sound ray direction and the response characteristics in the smaller sound ray direction with each other in a predetermined frequency band maybe performed. For example, generally, in the ultrasonic image used for the medical application, main information is included in the range of spatial frequencies from 0 cycle/mm to 1 cycle/mm. Accordingly, on the sound ray data in different response characteristics, for example, filter processing for matching the responses at 1 cycle/mm is performed.

Figures 4A, 4B:
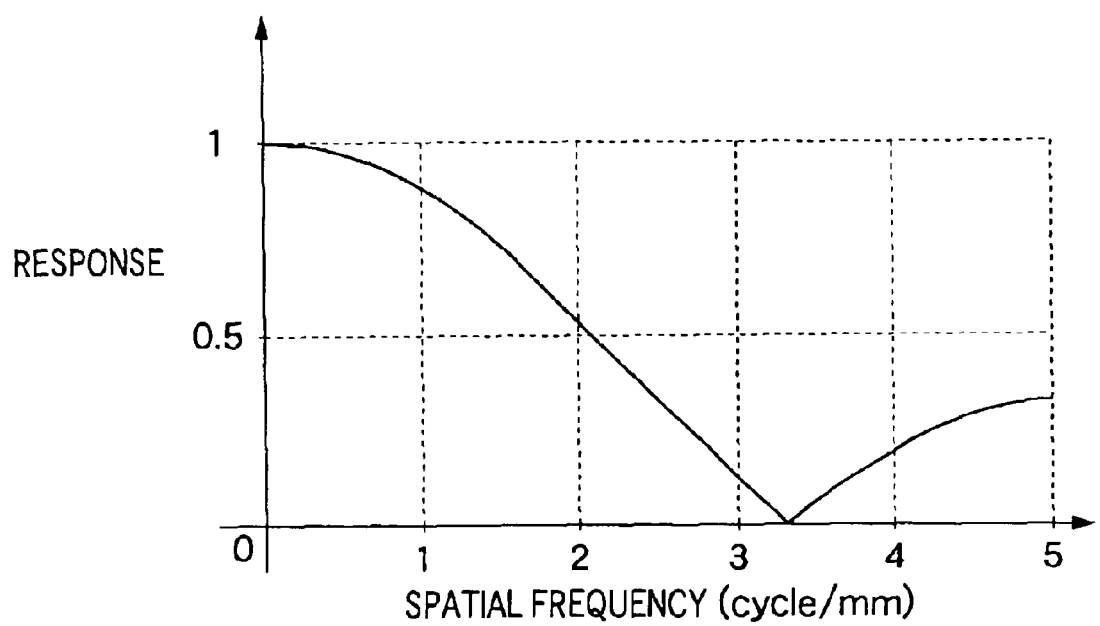
FIG. 4A shows a function representing low pass filter processing.
FIG. 4B shows filter coefficients to be used when performing low pass filter processing.
Figures 5A, 5B:
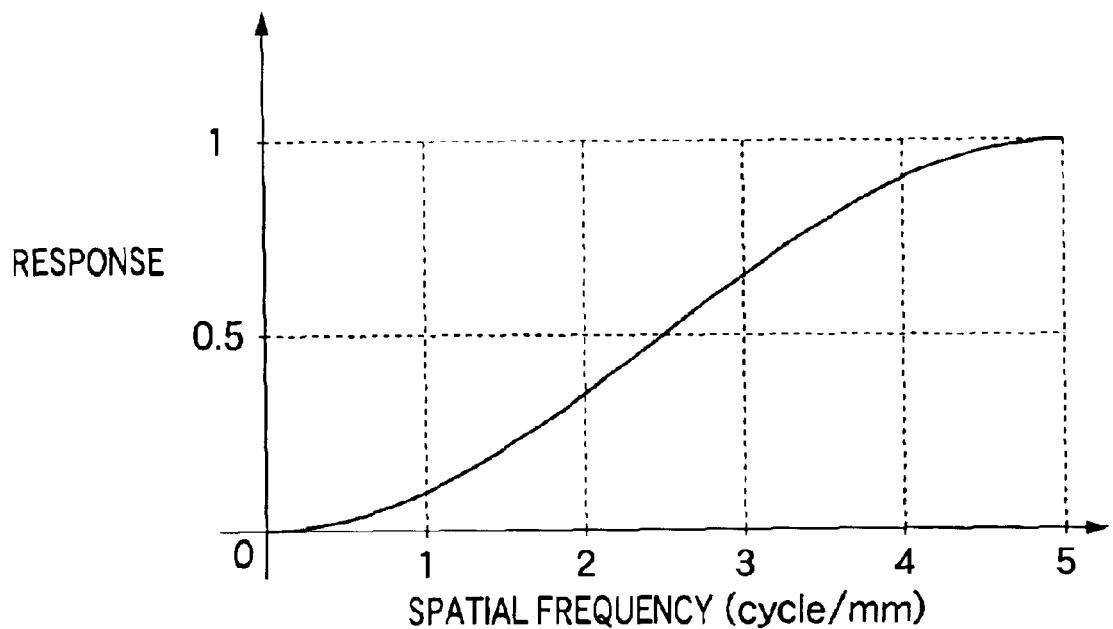
FIG. 5A shows a function representing high pass filter processing.
FIG. 5B shows filter coefficients to be used when performing high pass filter processing.
Figures 6A, 6B:
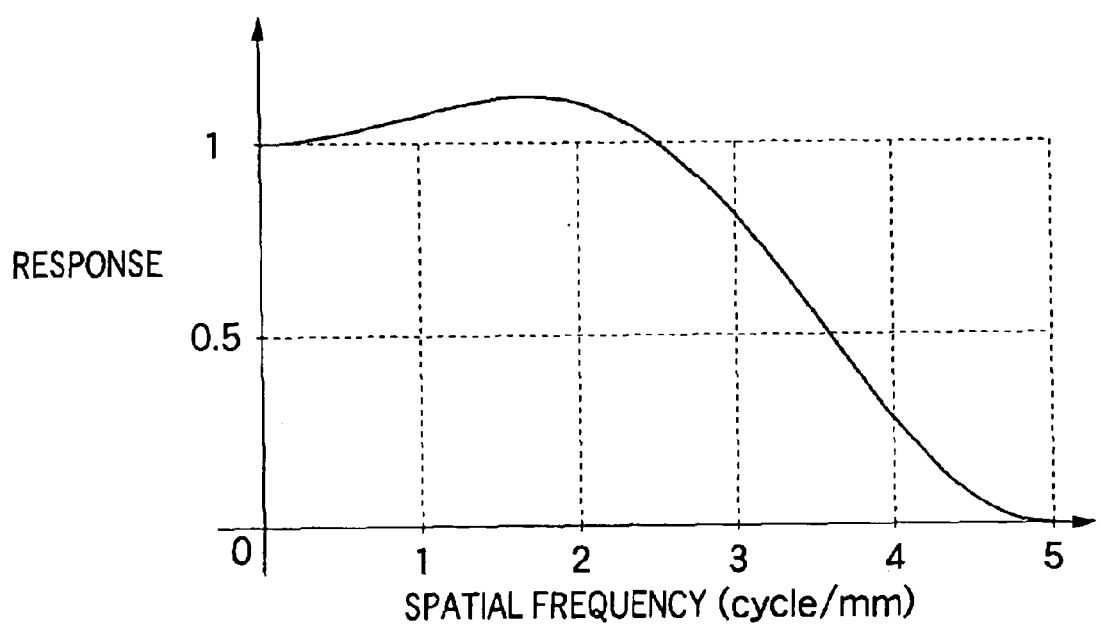
FIG. 6A shows a function representing band pass filter processing.
FIG. 6B shows filter coefficients to be used when performing band pass filter processing.

FIGS. 4A to 6B show examples of filter coefficients to be used for spatial filter processing in this embodiment. For example, as shown in FIG. 4A, in order to cut the high frequency components to smooth the image (low pass filter processing), weighting and averaging processing is performed on the sound ray data by using the filter coefficients in the table as shown in FIG. 4B. In addition, as shown in FIG. 5A, in order to cut the low frequency components to sharpen the image (high pass filter processing), weighting and averaging processing is performed on the sound ray data by using the filter coefficients in the table as shown in FIG. 5B. Further, as shown in FIG. 6A, in order to perform band pass filter processing for enhancing a predetermined frequency component, weighting and averaging processing is performed on the sound ray data by using the filter coefficients in the table as shown in FIG. 6B.

In the filter coefficient storage unit 26, such plural kinds of filter coefficients related to sound ray directions have been stored. This relating is performed so as to obtain the following tendency, for example. In the region where the sound ray angle is small, since the response of the higher bands is good, the response is made unchanged. On the other hand, in the region where the sound ray angle is large, since the response is reduced, the filter processing is performed so as to enhance the response according to the characteristics as shown in FIG. 6A.

Note that, in FIGS. 4B, 5B, and 6B, the mask size is made as 3×3 or 5×5, however, the mask size is not limited to these. Alternatively, for example, anisotropic filter coefficients etc. having the mask size such as 5×7 may be used.

Figure 7:
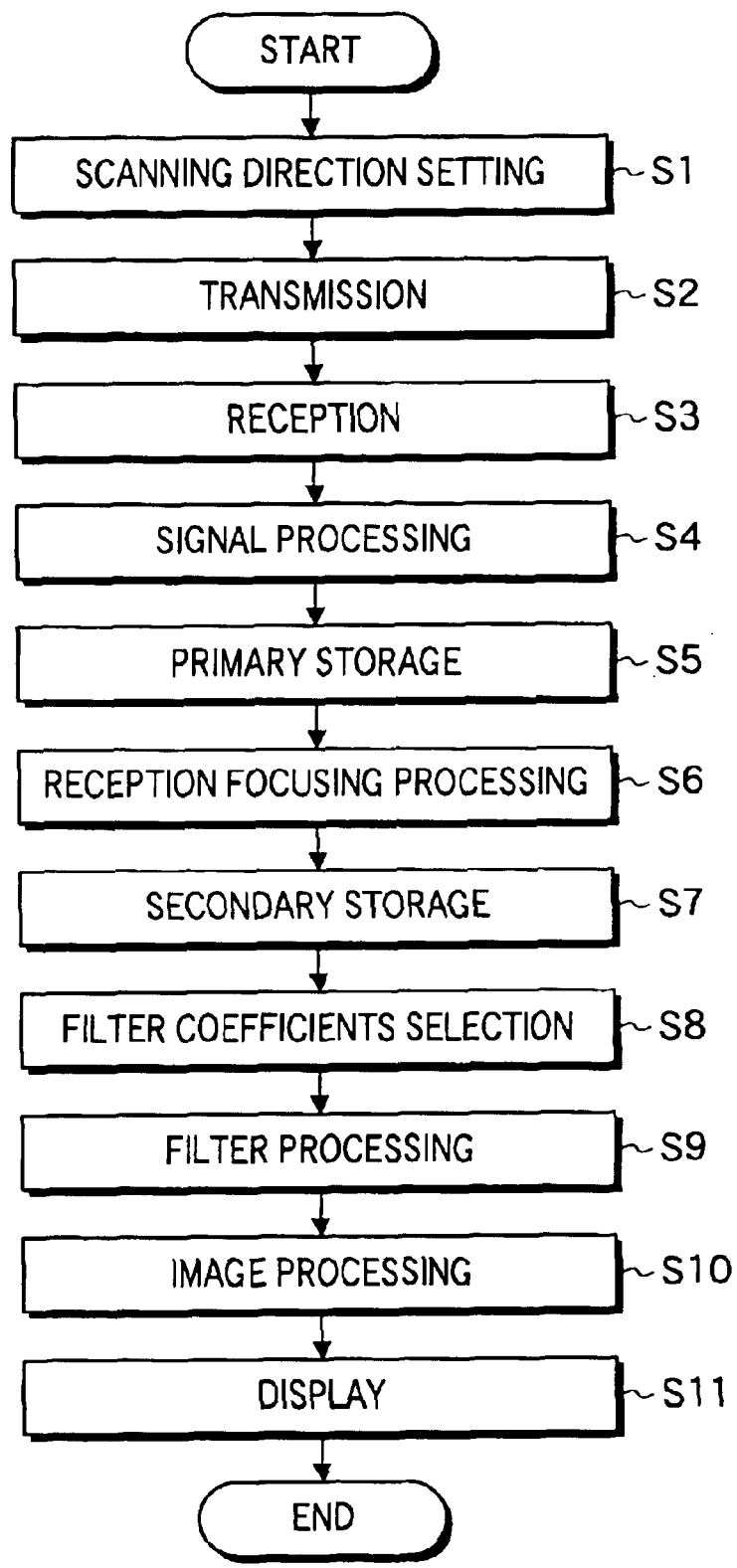
FIG. 7 is a flowchart showing the operation of the ultrasonic transmitting and receiving apparatus according to the first embodiment of the present invention.

Next, the operation of the ultrasonic transmitting and receiving apparatus according to this embodiment will be described by referring to FIGS. 1–2, and FIG. 7. FIG. 7 is a flowchart showing the operation of the ultrasonic transmitting and receiving apparatus according to this embodiment.

First, at step S1, the scanning control unit 11, for example, sets the scanning direction of the ultrasonic beam as shown in FIG. 2. Accordingly, the transmission control unit 13 sets delay times in the drive signal generating unit 14 based on the transmission delay pattern so that ultrasonic beams may be sequentially transmitted in the set scanning direction.

At step S2, the drive signal generating unit 14 generates drive signals. Thereby, ultrasonic waves are generated with predetermined timing from the plural ultrasonic transducers included in the ultrasonic transducer array 10. By the synthesis of wavefront of those unit beams, an ultrasonic beam is transmitted in the predetermined direction.

At step S3, the transmission and reception switching unit 15 is switched, and the ultrasonic transducer array 10 receives ultrasonic echoes. Each of the plural elements included in the ultrasonic transducer array 10 generates an electrical signal (detection signal) based on the received ultrasonic echo.

At step S4, the signal processing unit 21 performs signal processing such as logarithmic amplification, STC, filter processing for eliminating unwanted bands, A/D conversion on the detection signal outputted from each of the plural elements. At step S5, the signal processed detection signals (digital data) are sequentially stored in the primary storage unit 22.

At step S6, the reception control unit 24 performs reception focusing processing on the detection signals stored in the primary storage unit 22 based on the predetermined transmission delay pattern. Thereby, sound ray data representing the reception beams corresponding to the transmitting directions of ultrasonic beams. The sound ray data formed at step S6 is stored in the secondary storage unit 25 (step S7).

Figures 8A, 8B, 8C:
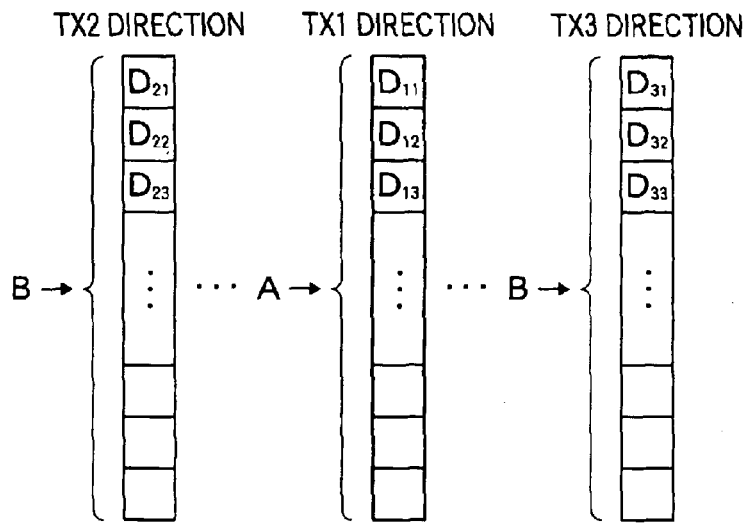
FIGS. 8A to 8C are diagrams for explanation of filter coefficients applied to the sound ray data relating to each sound ray direction shown in FIG. 2.

At step S8, the filter processing unit 27 selects filter coefficients in accordance with the sound ray direction of the sound ray data from the plural kinds of filter coefficients stored in the filter coefficient storage unit 26. Then, at step S9, the filter processing unit 27 performs filter processing on each sound ray data by using selected filter coefficients. For example, as shown in FIG. 8A, with respect to the sound ray data $D_{11}, D_{12}, \ldots$ relating to the direction of TX1 at small sound ray angle, response is not changed (for example, filter A as shown in FIG. 8B is used). Contrary, with respect to the sound ray data $D_{21}, D_{22}, \ldots$ and the sound ray data $D_{31}, D_{32}, \ldots$ respectively relating to the directions TX2 and TX3 at large sound ray angles, the filter processing for enhancing response is performed (for example, filter B as shown in FIG. 8C is used). Thereby, the sound ray data, which is adjusted so that the response characteristics may become uniform, is obtained.

Next, at step S10, the image processing unit 28 performs conversion of the scanning format on the filter processed sound ray data and constructs two-dimensional or three-dimensional image data, and performs image processing such as gain adjustment, contrast adjustment, and gradation processing on the image data.

Then, at step S11, the display unit 30 displays ultrasonic images on a display based on the image data image processed at step S10.

As described above, according to this embodiment, filter processing is performed on each sound ray data by using the filter coefficients selected in accordance with the sound ray direction. Therefore, ultrasonic images with uniform image quality can be obtained based on the sound ray data that has been adjusted so that the response characteristics may be uniform independently on the positions within the screen.

Next, an ultrasonic transmitting and receiving apparatus according to the second embodiment will be described. The ultrasonic transmitting and receiving apparatus according to this embodiment is formed by making changes to the filter processing operation in the filter processing unit 27 shown in FIG. 1. The rest of the constitution is the same as the ultrasonic transmitting and receiving apparatus shown in FIG. 1.

Figure 9A:
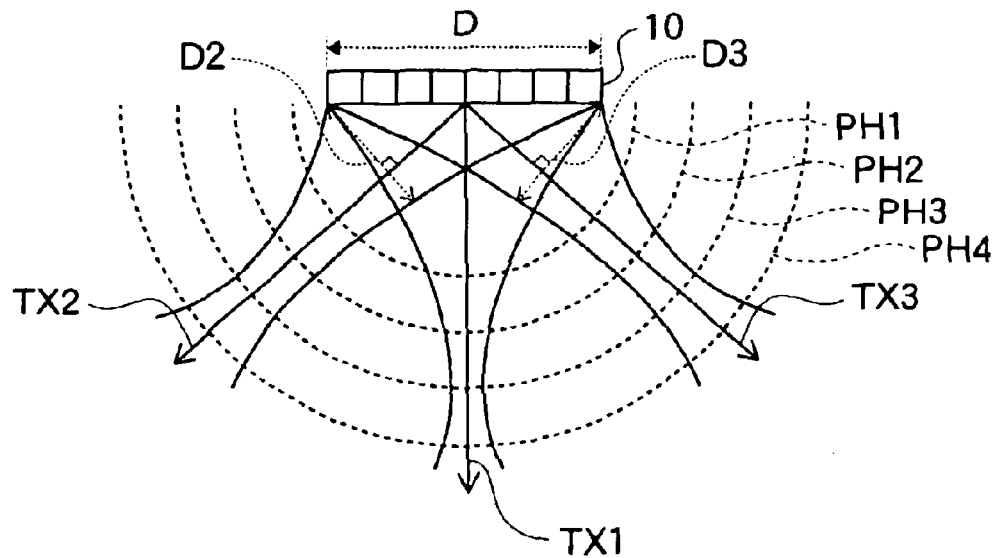
FIGS. 9A and 9B are diagrams for explanation of an ultrasonic transmitting and receiving apparatus according to the second embodiment of the present invention.

As shown in FIG. 9A, from the equation (1), the beam diameter of the ultrasonic beam differs in accordance with not only the sound ray direction, but also the distance (depth) "F" from the ultrasonic transducer. Accordingly, comparing the case of forming a focal point on the isochronal surface PH1 and the case of forming a focal point on the isochronal surface PH4, the beam diameter in the latter case becomes larger. In addition, since the higher frequency components of the ultrasonic wave are easier to be attenuated, the frequency components constituting the ultrasonic beams largely differ between the beam on the isochronal surface PH1 at a shorter propagation distance and the beam on the isochronal surface PH4 at a longer propagation distance. Therefore, in this embodiment, filter coefficients are selected in accordance with the sound ray direction and depth, and the filter processing is performed on the sound ray data by using the filter coefficients.

In this embodiment, in the filter coefficient storage unit 26, plural filter coefficients related to both sound ray directions and depth directions are stored. Further, the filter processing unit 27 performs filter processing by using the filter coefficients in accordance the spatial position of the data to be processed.

Figure 9B:
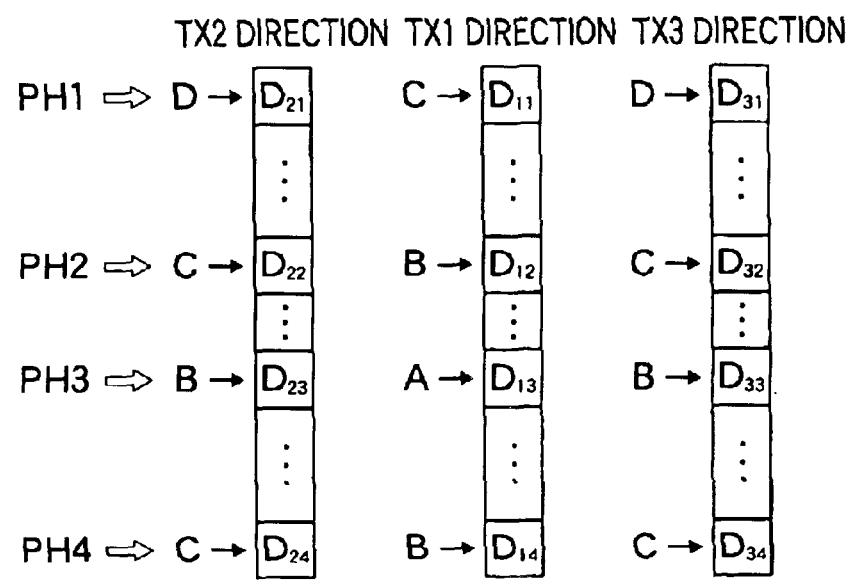

In FIG. 9B, filters A to D to be used in accordance with the sound ray direction and the depth of each data are shown. Here, the filter characteristics are made so that the response enhancement degree may be higher in the order from the filter A to the filter D. For example, in the sound ray data relating to the TX1 direction, the filter A having the lowest response enhancement degree is selected with respect to the data $D_{13}$ relating to the region on the isochronal surface PH3 where the focal point is formed, and the filter B to the filter C are selected so that the response enhancement degree may be stronger gradually as departing from the focal point (for example, data $D_{12}$, $D_{11}$, and data $D_{14}$). Further, on the same isochronal surface PH3, the filter A to the filter B are selected so that the response enhancement degree may be stronger from the vicinity of the center (for example, $D_{13}$) toward the vicinity of the periphery (for example, $D_{23}$ and $D_{33}$). The selection is similarly performed with respect to data relating to other sound ray directions and depths.

As described above, in this embodiment, filter processing is performed on the sound ray data by using the filter coefficients selected in accordance with the sound ray direction and the depth. Therefore, ultrasonic images with uniform image quality can be obtained based on the sound ray data that has been adjusted so that the response characteristics may be uniform independently of the positions within the screen.

Figure 10:
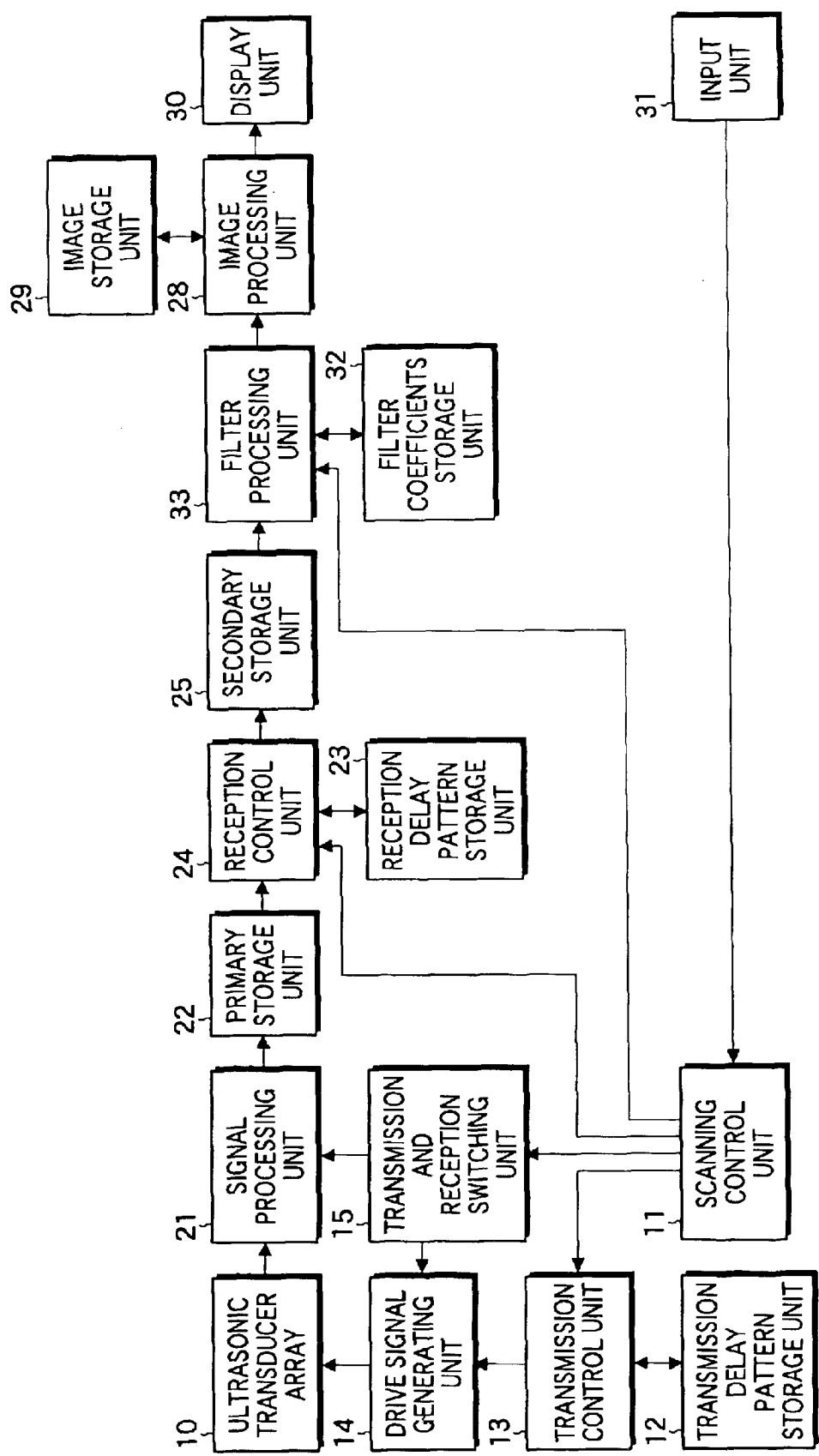
FIG. 10 is a block diagram showing the constitution of an ultrasonic transmitting and receiving apparatus according to the third embodiment of the present invention.

Next, an ultrasonic transmitting and receiving apparatus according to the third embodiment will be described. FIG. 10 is a block diagram showing the constitution of the ultrasonic transmitting and receiving apparatus according to this embodiment.

As shown in FIG. 10, this ultrasonic transmitting and receiving apparatus has an input unit 31, a filter coefficient storage unit 32, and a filter processing unit 33. The input unit 31 includes an input device such as a touch panel, keyboard, and mouse, and is provided on the operation panel handled by the operator. In addition, in the filter coefficient storage unit 32, plural kinds of filter coefficients in accordance with the sound ray directions and parts of the object as a target of imaging. Further, the filter processing unit 33 performs image processing on the sound ray data based on the scanning direction set by the scanning control unit 11 and the region of the object of imaging inputted from the input unit by using particular filter coefficients.

As also described above, in the ultrasonic image used for the medical application, a large amount of information is included in the range of spatial frequencies from 0 cycle/mm to 1 cycle/mm. However, in particular, the important spatial frequency band differs in accordance with the parts of the object as a target of imaging. For example, in the part such as abdomen and heart, the information in the low frequency bands is important, while, in the surface of the body (near the skin), the information in the low frequency bands on the order of 5 cycle/mm is also important. Therefore, in this embodiment, the filter coefficients are set so that the response characteristics that differ depending on the sound ray angles may be optimum characteristics in accordance with the part within the object as a target of imaging.

Figure 11:
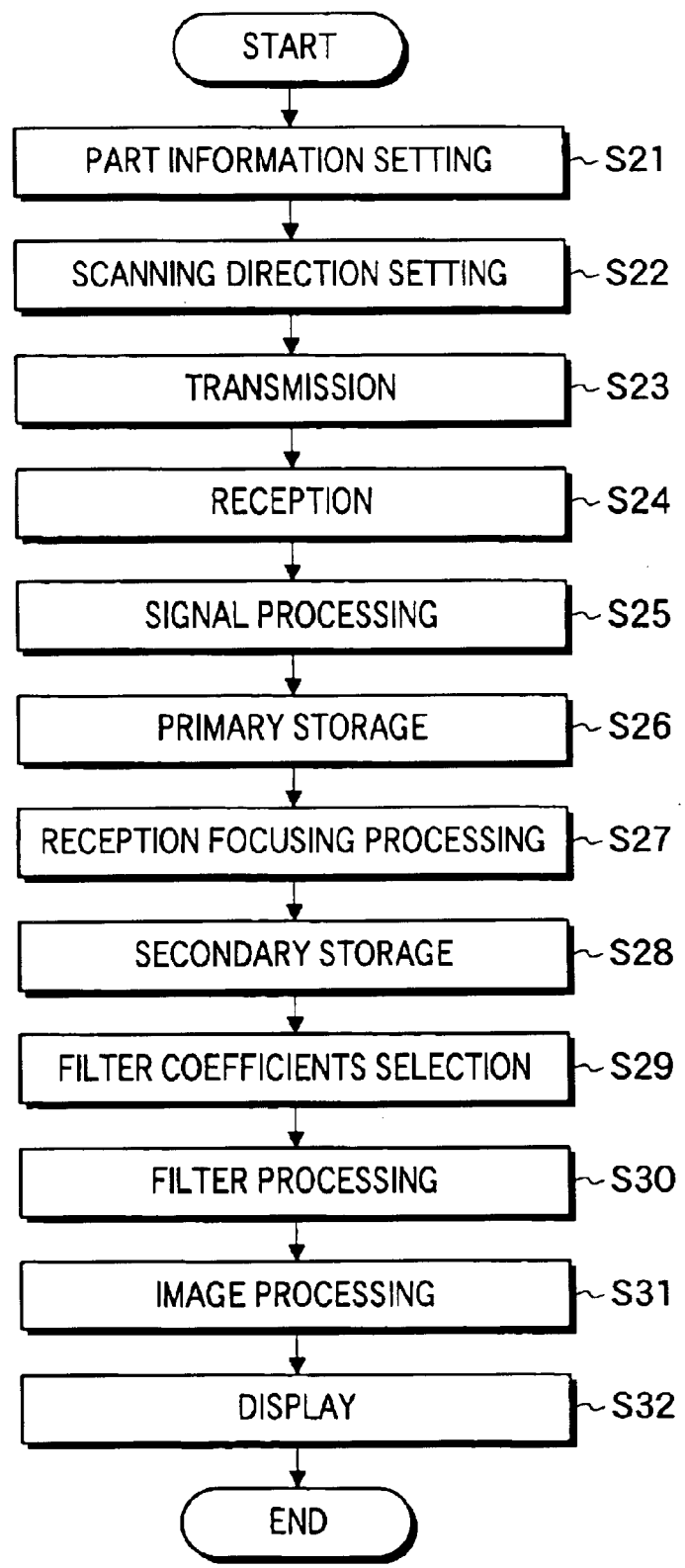
FIG. 11 is a flowchart showing the operation of the ultrasonic transmitting and receiving apparatus according to the third embodiment of the present invention.

FIG. 11 is a flowchart showing the operation of the ultrasonic transmitting and receiving apparatus according to this embodiment.

First, the operator inputs the part within the object as a target of imaging to the ultrasonic transmitting and receiving apparatus by using the input unit 31. In response to this, at step S21, the scanning control unit 11 sets part information to the filter processing unit 33. Then, at step S22, the scanning control unit 11 sets the scanning direction of the ultrasonic beam. Accordingly, the transmission control unit 13 sets delay times in the drive signal generating unit 14 based on the transmission delay pattern so that ultrasonic beams may be sequentially transmitted in the set scanning direction.

At the steps S23 to S28, the ultrasonic beams are transmitted and received. By performing signal processing on the detection signals of the ultrasonic echoes, sound ray data relating to each sound ray direction is stored in the secondary storage unit 25. The operation at these steps S23 to S28 is the same as the operation in the steps S2 to S7 described by referring to FIG. 7.

Then, at step S29, the filter processing unit 33 selects a filter coefficient group corresponding to the part information from among plural kinds of filter coefficient groups which have been stored in the filter coefficient storage unit 32 in relation to the parts of the object, and further selects filter coefficients from among the filter coefficient group in accordance with the sound ray direction of the sound ray data to be filter processed.

Subsequently, at step S30, the filter processing unit 33 performs filter processing on each sound ray data by using the selected filter coefficients. Thereby, the sound ray data having the response adjusted in accordance with the part within the object as a target of imaging is obtained.

Next, at step S31, the image processing unit 28 performs conversion of the scanning format on the filter processed sound ray data and constructs two-dimensional or three-dimensional image data, and performs image processing such as gain adjustment, contrast adjustment, and gradation processing on the image data.

Then, at step S32, the display unit 30 displays ultrasonic images on a display based on the image data image processed at step S31.

As described above, in this embodiment, since the filter coefficients are selected in accordance with the part within the object as a target of imaging and the sound ray direction, ultrasonic images suitable for ultrasonic diagnosis can be obtained based on the sound ray data having the response characteristics that has been adjusted in accordance with the part.

In this embodiment, the filter coefficients are selected in accordance with the part within the object and the sound ray direction, however, the filter coefficients may be selected in accordance with the part within the object, the sound ray direction, and the depth. Thereby, the response characteristics in the respective regions within the screen can be adjusted more precisely.

In the above-described first to third embodiments, spatial filter processing is performed on the sound ray data so as to match the response characteristics in the arbitrary spatial frequency components. However, as described below, by performing multiple resolving power decomposition on the sound ray data, the information of signals may be decomposed with respect to each component from a lower frequency to a higher frequency to adjust the response characteristics with respect to each spatial frequency component in a predetermined band.

Here, the multiple resolving power decomposition will be described by referring to FIGS. 12 to 20.

First, low pass filter processing is performed on the sound ray data (original sound ray data) $S_0$ stored in the secondary storage unit 25 (FIG. 1) by using, for example, the filter coefficients corresponding to Gaussian distribution as shown in FIG. 12. The filter coefficients as shown in FIG. 12 are obtained by assuming $\sigma=1$ in the following equation (2).

$$f(t)=\exp(-t^2/2\sigma^2) \qquad (2)$$

Here, such filter coefficients are used because Gaussian signal has good localization in the frequency space and the real space.

Thereby, as shown in FIG. 13, sound ray data $S^1$ in which every other pixel has been filter processed on the original sound ray data $S_0$ is obtained. The sound ray data $S_1$ has a ½ size per one dimension compared with the original sound ray data $S_0$, that is, a ¼ size in the two-dimension including the x direction and y direction. Further, sound ray data $S_2$ is obtained by performing lowpass filter processing similarly on the sound ray data $S_1$. By repeating such processing in "n" times, "n" pieces of sound ray data $S_k$ each having a $½^{2k}$ (k=1 ton) size are obtained. As shown in FIG. 14, the response characteristics in these pieces of sound ray data $S_k$ are formed by eliminating high frequency components more as k becomes larger.

In place of the one dimensional filter as shown in FIG. 12, filter processing may be performed at once with respect to the x direction and y direction by using, for example, a two-dimensional filter of 5×5 in mask size.

Then, interpolation computation is performed on the sound ray data $S_k$. The interpolation computation is performed by using, for example, Gaussian signal as an interpolation factor as shown in the equation (3).

$$I(t)=2\sigma \cdot \exp(-t^2/2\sigma^2) \qquad (3)$$

Practically, approximation by assuming that $\sigma=2^{k-1}$ in the equation (3) is used.

When interpolating the sound ray data $S_1$, since k=1, $\sigma=1$ is held. FIG. 15 shows the interpolation factor (5×1) in this case. With respect to the sound ray data $S_k$, the pixels that have values of zero in every other pixel is interpolated one by one as shown in FIG. 16, and further processed by using interpolation factor as shown in FIG. 15, so that blur sound ray data $S_1'$ scaled up to the same size as the original sound ray data $S_0$ is obtained.

Next, interpolation computation is performed on the sound ray data $S_2$. In this case, since k=2 in the equation (3), $\sigma=2$ is held. FIG. 17 shows the interpolation factor (11×1) in this case. With respect to the sound ray data $S_2$, the pixels that have values of zero in every other pixel is interpolated three by three as shown in FIG. 18, and further processed by using interpolation factor as shown in FIG. 15, blur sound ray data $S_2'$ scaled up to the same size as the original sound ray data $S_0$ is obtained.

Figure 19:
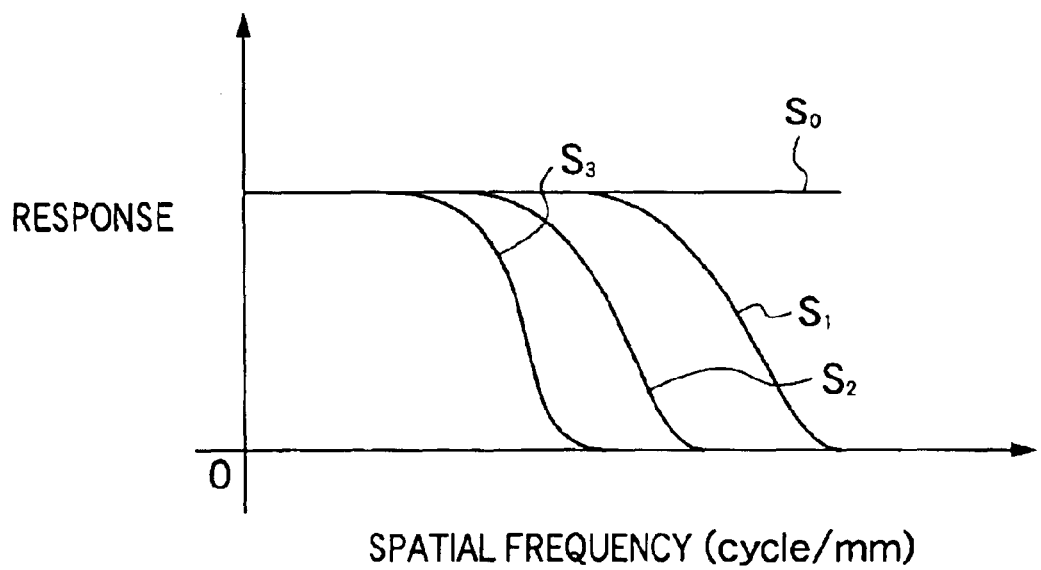
FIG. 19 is a diagram for explanation of multiple resolving power decomposition.

Similarly, interpolation computation is performed on the sound ray data $S_k$ (k=3 to n). Thereby, pieces of blur sound ray data each having different resolving power, that is, having multiple resolving power with different frequency response characteristics are obtained. FIG. 19 shows response characteristics in these pieces of sound ray data. As the value of k of the blur sound ray data $S_k'$ is larger, the high frequency components of the original sound ray data $S_0$ are more eliminated.

Figure 20:
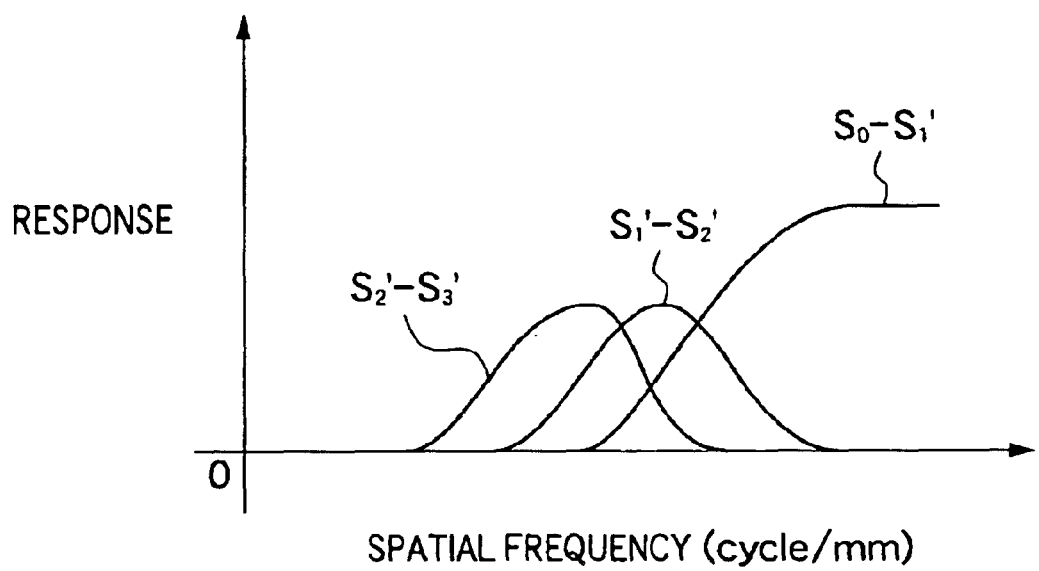
FIG. 20 is a diagram for explanation of multiple resolving power decomposition.
Figure 21:
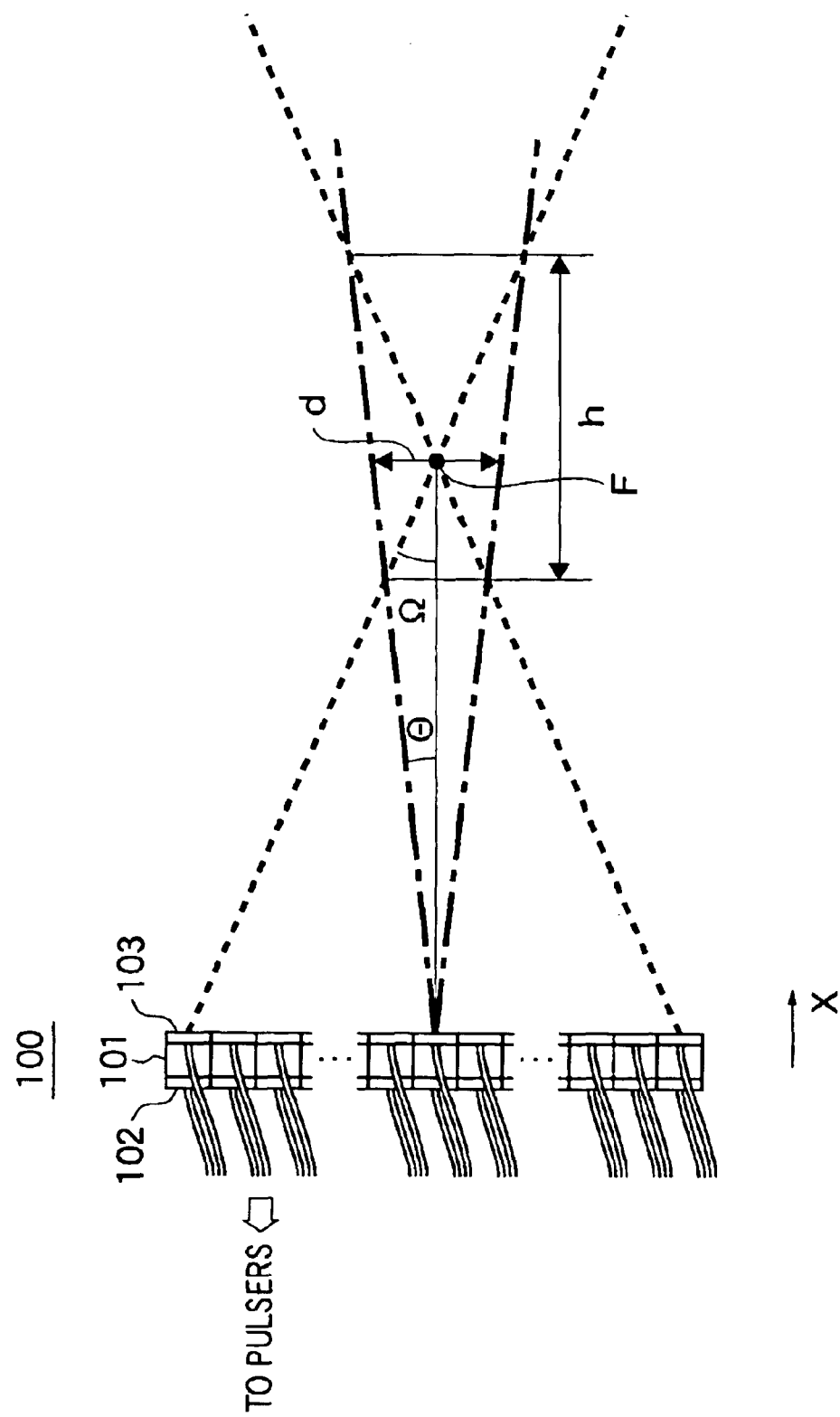
FIG. 21 is a diagram showing the structure of a conventional ultrasonic transducer array and an ultrasonic beam transmitted therefrom.
Figure 22A:
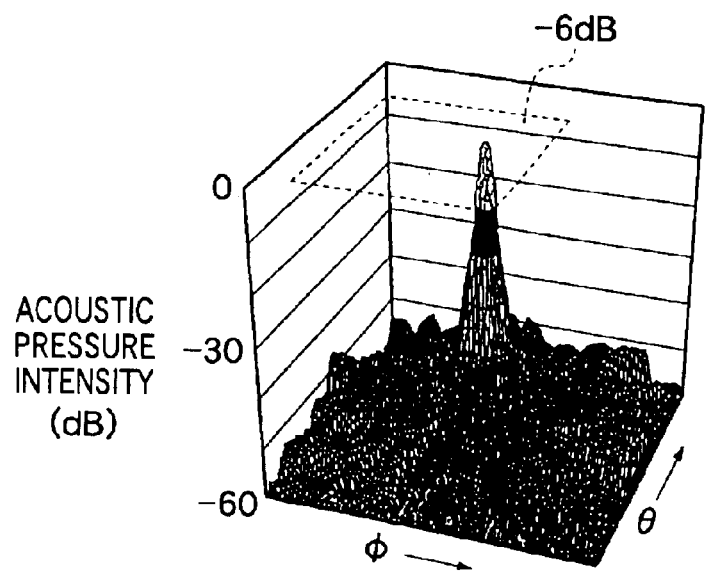
FIGS. 22A and 22B show acoustic pressure intensity distributions representing ultrasonic beams in different sound ray directions.
Figure 22B:
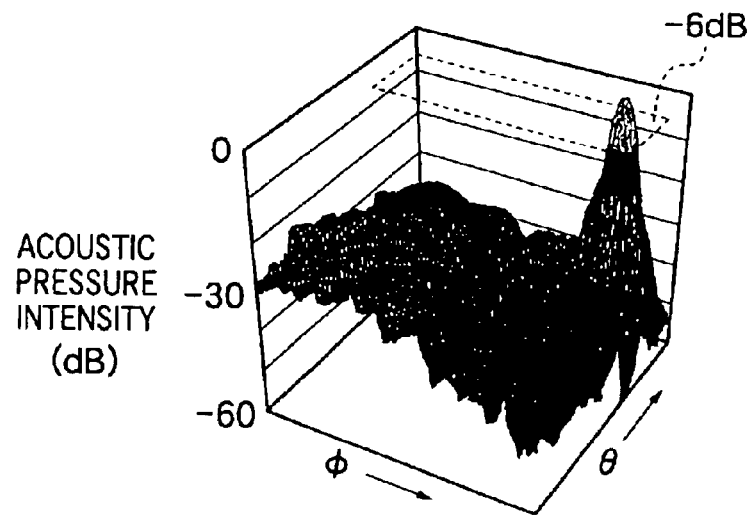

Next, band-limited sound ray data is obtained based on the original sound ray data $S_0$ and the blur sound ray data $S_k'$. The band-limited sound ray data is obtained by performing subtraction of blur sound ray data of adjacent frequency bands. That is, $S_0-S_1'$, $S_1'-S_2'$, ..., $S_{k-1}'-S_k'$ are performed. Thereby, as shown in FIG. 20, frequency characteristics of the band-limited sound ray data are obtained.

Then, by performing filter processing on the respective plural pieces of band-limited sound ray data obtained as described above, the response is controlled with respect to each of the frequency bands. Further, the filter processed plural pieces of band-limited sound ray data are accumulated and added to the original data.

As described above, by using multiple resolving power decomposition, smooth response characteristics with high adjustment accuracy can be obtained. By the way, details about multiple resolving power decomposition would be understood by referring to Japanese Patent Application Publication JP-A-10-75395.

In the above-described first to third embodiments, the case where moving images are displayed by performing signal processing and image processing sequentially while scanning the object has been described. However, the same adjustment of response characteristics and image processing as that described above may be performed on still images. In that case, it is desired to use filter coefficients which are different from the filter coefficients to be used when the filter processing is performed in the moving images. That is, in the case of still images, since there is no problem even if calculated amounts increase to take some more time, it is desired that factors such as sound ray directions, depths, etc. having effects on the responses are decomposed further in detail to adjust the responses precisely. In addition, it is also desired that multiple resolving power decomposition is performed. There by, the image quality of ultrasonic images can be improved further.

Further, in the above described first to third embodiments, filter processing has been performed so that the response characteristics may become uniform independently of positions within the screen. However, contrary, filter processing may be performed so that the response characteristics in a particular region may be different. For example, with respect to lung, it is desired that the low frequency components are enhanced, while, with respect to stomach, it is desired that the high frequency components are enhanced in order to observe grooves of the stomach wall. Therefore, in the case where these images are simultaneously observed, filter processing is performed by selecting different filter coefficients in accordance with the directions, depths, and parts within the object. Thereby, ultrasonic images suitable for the purpose of the ultrasonic diagnosis can be obtained.

As described above, according to the present invention, since filter processing is performed by using different filter coefficients in accordance with sound ray directions, ultrasonic images with good image quality can be obtained based on the sound ray data that has been adjusted so that the response characteristics may be uniform independently of the positions within the screen.

What is claimed is:

1. An ultrasonic transmitting and receiving apparatus comprising:

an ultrasonic transducer array including plural ultrasonic transducers for transmitting ultrasonic waves and receiving ultrasonic waves reflected from an object to be inspected;

drive signal generating means for generating drive signals for respectively driving said plural ultrasonic transducers;

transmission control means for controlling said drive signal generating means such that ultrasonic waves to be transmitted from said plural ultrasonic transducers form a transmission beam to be transmitted in at least one sound ray direction;

reception control means for performing reception focusing processing on plural detection signals obtained based on ultrasonic waves received by said plural ultrasonic transducers so as to generate sound ray data representing ultrasonic information relating to said at least one sound ray direction;

storage means for storing plural kinds of filter coefficients related to plural sound ray directions, respectively; and filter processing means for performing filter processing on the sound ray data generated by said reception control means by using filter coefficients related to said at least one sound ray direction in which transmission and reception have been performed from among said plural kinds of filter coefficients.

2. An ultrasonic transmitting and receiving apparatus according to claim 1, wherein said plural kinds of filter coefficients are related to the plural sound ray directions, respectively, such that responses may become uniform in plural different regions included in an ultrasonic image.

3. An ultrasonic transmitting and receiving apparatus according to claim 1, wherein said filter processing means performs filter processing on the sound ray data generated by said reception control means by using different filter coefficients in accordance with spatial frequency components thereof.

4. An ultrasonic transmitting and receiving apparatus according to claim 1, wherein said filter processing means performs filter processing on said sound ray data by using different filter coefficients between a case of displaying a still image and a case of displaying a moving image.

5. An ultrasonic transmitting and receiving apparatus according to claim 1, wherein:

said storage means stores plural kinds of filter coefficients related to the plural sound ray directions and distances from said ultrasonic transducer array; and said filter processing means performs filter processing on data relating to a region included in said sound ray data by using filter coefficients related to said at least one sound ray direction in which transmission and reception have been performed and a distance between said ultrasonic transducer array and the region.

6. An ultrasonic transmitting and receiving apparatus according to claim 5, wherein said plural kinds of filter coefficients are related to the plural sound ray directions and distances from said ultrasonic transducer array such that responses may become uniform in plural different regions included in an ultrasonic image.

7. An ultrasonic transmitting and receiving apparatus according to claim 5, wherein said filter processing means performs filter processing on the sound ray data generated by said reception control means by using different filter coefficients in accordance with spatial frequency components thereof.

8. An ultrasonic transmitting and receiving apparatus according to claim 5, wherein said filter processing means performs filter processing on said sound ray data by using different filter coefficients between a case of displaying a still image and a case of displaying a moving image.

9. An ultrasonic transmitting and receiving apparatus according to claim 1, wherein:

said storage means stores plural kinds of filter coefficients related to the plural sound ray directions and plural parts of the object; and said filter processing means performs filter processing on said sound ray data by using filter coefficients related to said at least one sound ray direction in which transmission and reception have been performed and a part within the object as a target of imaging.

10. An ultrasonic transmitting and receiving apparatus according to claim 9, wherein said plural kinds of filter coefficients are related to the plural sound ray directions and the plural parts of the object, respectively, such that responses may become uniform in plural different regions included in an ultrasonic image.

11. An ultrasonic transmitting and receiving apparatus according to claim 9, wherein said filter processing means performs filter processing on the sound ray data generated by said reception control means by using different filter coefficients in accordance with spatial frequency components thereof.

12. An ultrasonic transmitting and receiving apparatus according to claim 9, wherein said filter processing means performs filter processing on said sound ray data by using different filter coefficients between a case of displaying a still image and a case of displaying a moving image.

13. An ultrasonic transmitting and receiving apparatus according to claim 1, wherein:

said storage means stores plural kinds of filter coefficients related to the plural sound ray directions, distances from said ultrasonic transducer array, and plural parts of the object; and said filter processing means performs filter processing on data relating to a region included in said sound ray data by using filter coefficients related to said at least one sound ray direction in which transmission and reception have been performed, a distance between said ultrasonic transducer array and the region, and a part within the object as a target of imaging.

14. An ultrasonic transmitting and receiving apparatus according to claim 13, wherein:

said plural kinds of filter coefficients are related to the plural sound ray directions, distances from said ultrasonic transducer array, and plural regions of the object such that responses may become uniform in plural different regions included in an ultrasonic image.

15. An ultrasonic transmitting and receiving apparatus according to claim 13, wherein said filter processing means performs filter processing on the sound ray data generated by said reception control means by using different filter coefficients in accordance with spatial frequency components thereof.

16. An ultrasonic transmitting and receiving apparatus according to claim 13, wherein said filter processing means performs filter processing on said sound ray data by using different filter coefficients between a case of displaying a still image and a case of displaying a moving image.

* * * * *